United States Patent
Barker et al.

(10) Patent No.: US 6,981,575 B2
(45) Date of Patent: Jan. 3, 2006

(54) CONCRETE RAIL SAFETY DEVICE FOR AN ELEVATOR CAR

(75) Inventors: Frederick H. Barker, Bristol, CT (US); Richard E. Peruggi, Glastonbury, CT (US)

(73) Assignee: Otis Elevator Company, Farmington, CT (US)

( * ) Notice: Subject to any disclaimer, the term of this patent is extended or adjusted under 35 U.S.C. 154(b) by 682 days.

(21) Appl. No.: 09/406,445

(22) Filed: Sep. 27, 1999

(65) Prior Publication Data

US 2001/0047910 A1    Dec. 6, 2001

(51) Int. Cl.
    *B66B 5/22*    (2006.01)
(52) U.S. Cl. .................. 187/372; 187/376; 188/265
(58) Field of Classification Search ............... 187/287, 187/288, 370, 371, 372, 375, 376; 188/265
    See application file for complete search history.

(56) References Cited

U.S. PATENT DOCUMENTS

| | | | | |
|---|---|---|---|---|
| 259,019 | A | * | 6/1882 | Hutchinson ................. 187/372 |
| 467,591 | A | * | 1/1892 | Fowler et al. .............. 187/372 |
| 838,770 | A | * | 12/1906 | Busch ....................... 187/372 |
| 3,516,304 | A | * | 6/1970 | Vermette ................... 187/372 |
| 3,601,227 | A | * | 8/1971 | Burch ........................ 187/288 |
| 3,762,512 | A | * | 10/1973 | McIntyre .................... 187/372 |
| 5,065,845 | A | * | 11/1991 | Pearson ..................... 187/376 |
| 5,230,406 | A | * | 7/1993 | Poon .......................... 187/376 |
| 5,363,942 | A | * | 11/1994 | Osada ......................... 187/376 |
| 5,377,788 | A | * | 1/1995 | Biewald et al. .............. 187/374 |
| 5,386,889 | A |  | 2/1995 | Pipes ........................... 188/67 |
| 5,503,257 | A | * | 4/1996 | Sugita et al. ............ 188/251 R |
| 5,531,295 | A | * | 7/1996 | Kopman et al. ......... 188/265 X |
| 5,782,319 | A | * | 7/1998 | Woodruff et al. ........... 187/376 |
| 5,964,322 | A | * | 10/1999 | Thompson et al. ..... 188/251 M |
| 5,979,615 | A | * | 11/1999 | Thompson et al. ...... 188/251 A |

FOREIGN PATENT DOCUMENTS

| | | | |
|---|---|---|---|
| DE | 156178 | | 11/1904 |
| DE | 353312 | | 5/1922 |
| DE | 496091 A | * | 4/1930 |
| DE | 2 054 936 | | 5/1971 |
| EP | 183616 A2 | * | 6/1985 |
| EP | 498597 A2 | * | 8/1992 |
| EP | 0 968 954 A1 | | 1/2000 |
| GB | 1226439 A | * | 3/1971 |
| GB | 2190356 A | * | 11/1987 |
| JP | 1-271384 A | * | 10/1989 |
| SU | 796146 A | * | 1/1981 |
| SU | 918234 A | * | 4/1982 |
| SU | 935423 A | * | 6/1982 |

\* cited by examiner

*Primary Examiner*—Eileen D. Lillis
*Assistant Examiner*—Thuy V. Tran

(57) ABSTRACT

A safety device to arrest movement of an elevator car guided by non-metallic guide rails employs a friction surface mounted on a wedge. The wedge is located in proximity to an angular horizontal locator when in the unengaged position. Upon activation of the wedge during an overspeed condition the horizontal locator urges the friction surface of the wedge into contact with the guide rail.

20 Claims, 4 Drawing Sheets

FIG.3A
FIG.3B
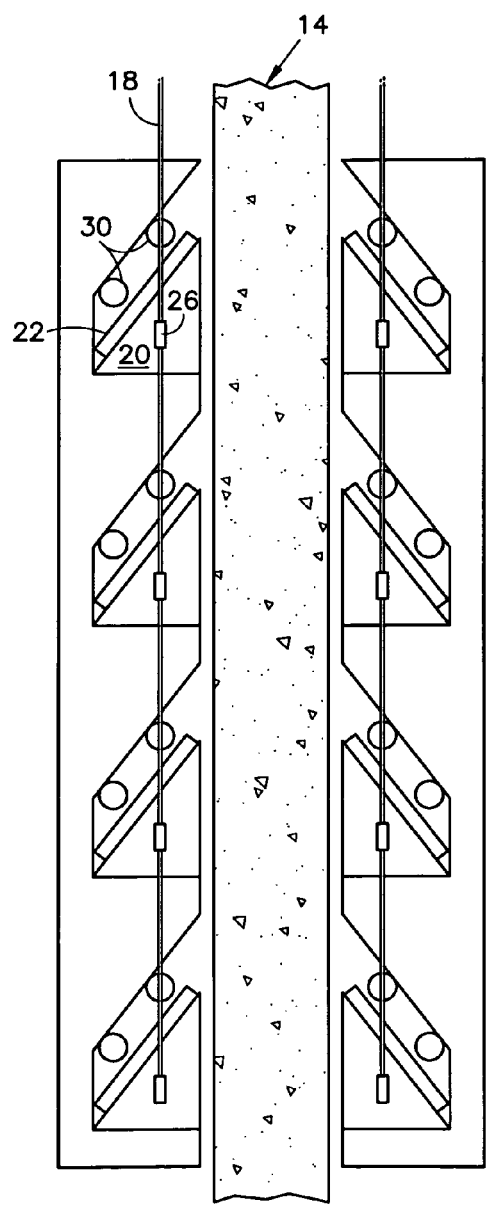
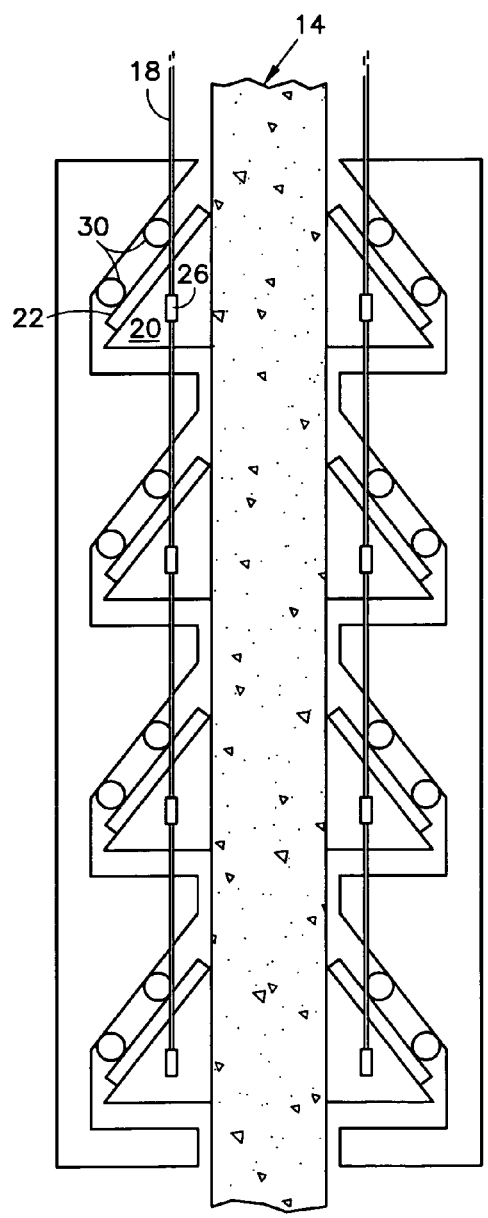

CONCRETE RAIL SAFETY DEVICE FOR AN ELEVATOR CAR

BACKGROUND OF THE INVENTION

1. Field of the Invention

The invention relates to the elevator and passenger transportation device industry. More particularly the invention relates to elevator car safety devices that arrest the movement of an elevator car experiencing an over speed condition.

2. Prior Art

Traditionally, elevator systems have engaged steel guide rails to guide elevator cars in hoistways. Such rails are reliable and safe and are used often in the industry. Safety devices for use with such rails are many and varied, all of which work well for their intended purposes.

In an ever tightening market with respect to building size and cost per square foot as well as speed of installation and construction of various features, alternative non-metallic guide rail structures are being considered such as concrete guide rail structures. Where non-metallic guide rail structures are employed, alternative safety systems are also needed. Currently there are no safety systems compatible with non-metallic guide rails. Therefore, the art is in need of a safety system capable of arresting movement of an elevator car that has experienced an overspeed condition on a non-metallic guide rail system.

SUMMARY OF THE INVENTION

The invention solves the prior need for a safety system directed to an elevator car mounted on a non-metallic guiderail system. The system of the invention recognizes the frangibility of non-metallic, especially concrete, guide rail systems and provides sufficient surface area in conjunction with a high friction contact surface so that sufficient stopping force can be generated while maintaining point pressure below a level at which concrete damage would take place.

The device comprises one or more wedges of a strong material with a high friction surface material mounted to a surface of the wedge that will contact a guide rail surface in the event an overspeed condition occurs. It is also contemplated by the inventors hereof to create the entire wedge or a portion of the wedge out of a high friction material so that only a bearing surface would need to be mounted to the wedge and no additional friction material would need to be mounted to the wedge. The wedge is urged into such contact with the guide rail by a slide or roller component disposed angularly to the direction of movement of the elevator car to which it is mounted. The wedge is preferably connected to a governor or similar assembly so that it cannot move along with the elevator car at a speed faster than a predetermined maximum. It should be noted that a solenoid could be substituted as an electronic actuator if desired. In the event such an overspeed condition occurs, the wedge is drawn against the slide or roller component which imparts a horizontal force thereto and urges the wedge into contact with the guide rail at which point a braking action is achieved. Preferably wedges will be disposed in pairs on opposing surfaces of each guide rail. A plurality of pairs of wedges reduces the surface area necessary for each individual wedge and can render the system more manageable. In another embodiment of the invention, a safety will brake an elevator car falling down or falling up.

BRIEF DESCRIPTION OF THE DRAWINGS

FIG. 3A is a schematic view of an alternative embodiment of the invention wherein multiple safety devices are illustrated working in concert and in the disengaged position;

FIG. 3B is a schematic view similar to FIG. 3A but in the engaged position;

DETAILED DESCRIPTION OF THE INVENTION

Figure 1:
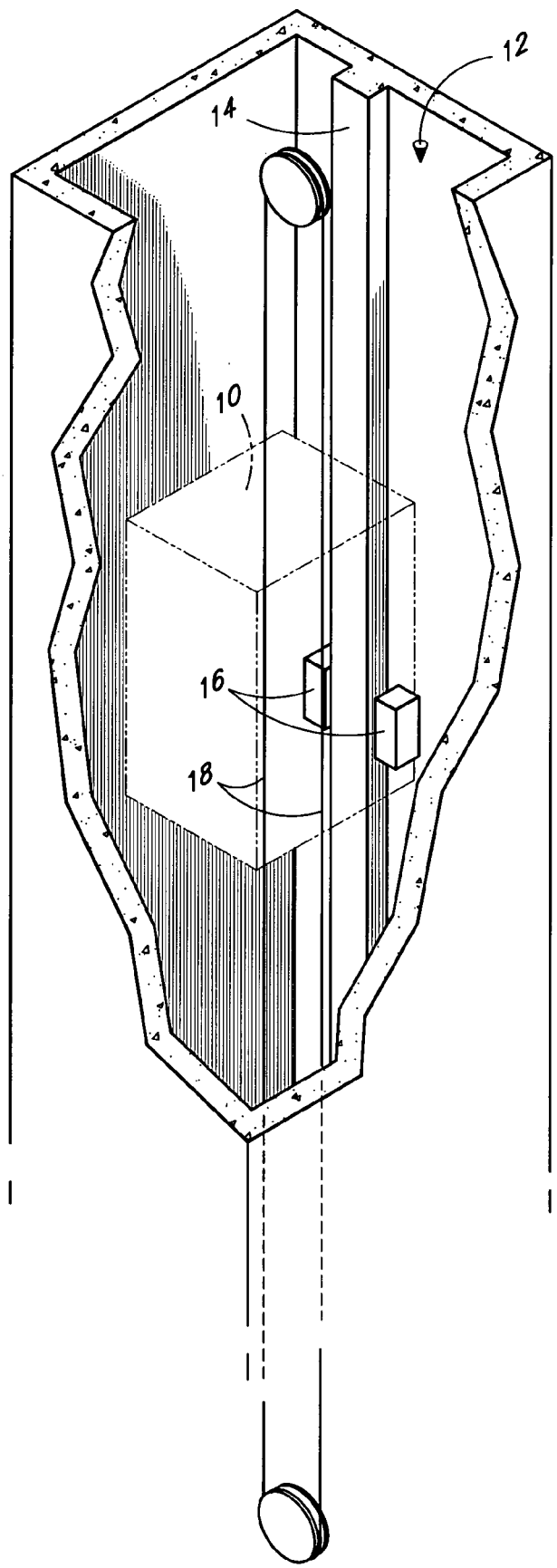
FIG. 1 is a perspective view of a broken away elevator shaft having an elevator car mounted on concrete guide rails and illustrating the positions of the safety device components of the invention.

Referring to FIG. 1, one of ordinary skill in the art will recognize an elevator car 10 in an elevator shaft 12. The guide rails 14 illustrated are non-metallic. In the invention, the guide rails 14 are preferably constructed of a high compression strength material such as concrete. Where concrete is employed, it is preferably poured integrally with the hoistway. Illustrated at the side of elevator car 10 is a safety device (safety) 16 which is positioned on elevator car 10 so as to remain proximate guide rails 14 at all times. One embodiment of the invention employs a governor rope 18 to actuate safety 16 in the event of an overspeed condition.

Figure 2A:
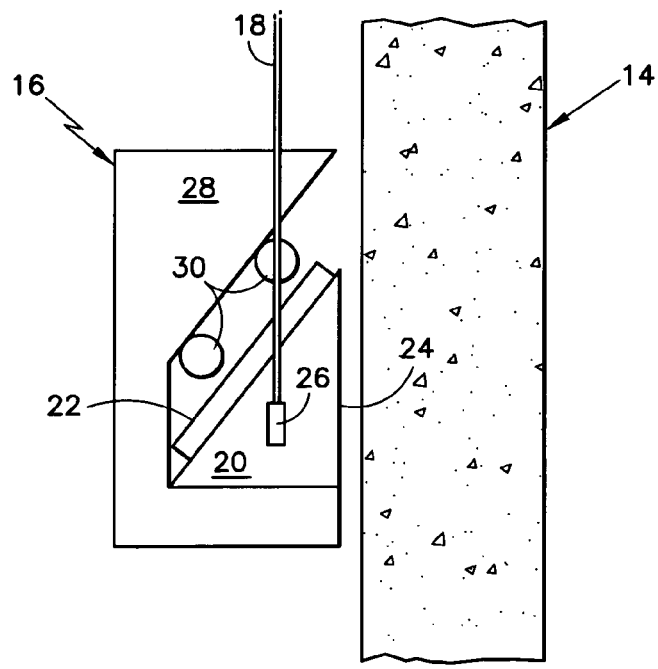
FIG. 2A is a schematic view of a safety device of the invention in the disengaged position.
Figure 2B:
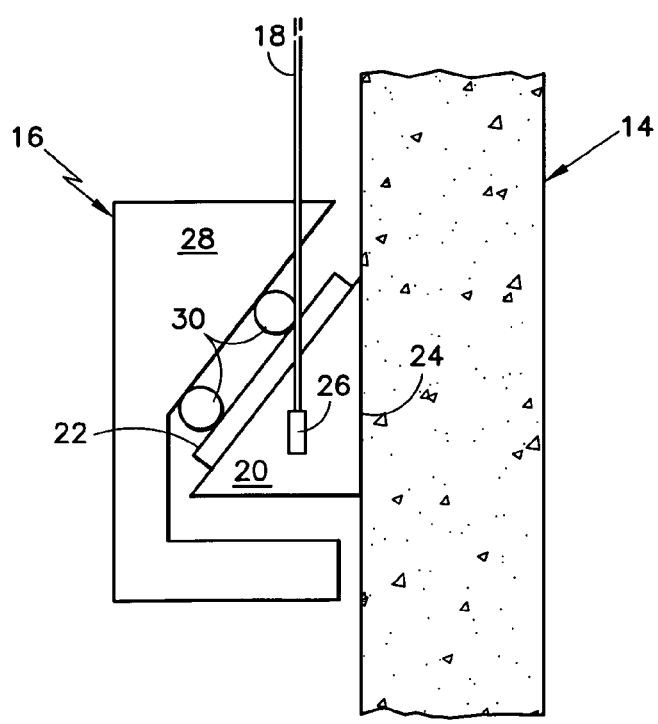
FIG. 2B is a schematic view of the invention similar to FIG. 2A but in the engaged position.

Referring now to FIGS. 2A and 2B the safety device of the invention is schematically illustrated. Considering FIG. 2A first, device 16 of the invention will be understood to comprise a wedge 20 upon which a bearing surface 22 which may be planar as shown or a curved surface and a friction material 24 are mounted. Wedge 20 is connected to an actuator which as illustrated may comprise a governor rope 18 and an attachment 26. Wedge 20 is housed within a housing 28. Also housed in housing 28 is a horizontal locator which comprises at least two rollers 30 (as illustrated) or slides (not shown) with which a bearing surface 22 may be brought into contact. As stated above, when bearing surface 22 is brought into contact with rollers 30, a horizontal force is introduced to wedge 20 which urges it toward rail 14 (to the right in the illustration). The angles of horizontal locator 30, bearing surface 22 and friction surface 24 are not critical in themselves but should be selected to create a normal force against the concrete rail 14. As the wedge is further urged toward rail 14 by roller 30, friction surface 24 is brought into contact with rail 14 (see FIG. 2B) and acts to decelerate the movement of car 10, rapidly resulting in a complete stop of car 10.

In a preferred embodiment of the invention, wedge 20 is constructed of rubber material and friction surface 24 is integral with the material of the wedge. In another preferred embodiment, the wedge is constructed of a different material capable of withstanding the compressive force and shear force to be imparted upon it during use and may have a friction surface of the same material or a different material.

In either of these embodiments it is preferred to provide a steel or cast iron material as bearing surface 22 to better distribute the load placed upon wedge 20 by rollers 30.

The friction surface 24 is preferably a relatively high friction material such as vulcanized rubber (or other material) similar to an automobile tire. The material preferably will provide a coefficient of friction of about 1.0 relative to the non-metallic guide rail. The preferably higher coefficient of friction available in surface 24 than what would be employed in a conventional safety for use with a steel guide rail allows a lower pressure to be used against the concrete rail by the safety of the invention and still develop the needed stopping force. A larger surface area of the friction surface 24 also allows for a reduction in the pressure required. Reduction in required pressure is beneficial for non-metallic guide rails since at least in the case of concrete rails, damage could easily be done thereto by higher, small area compressive forces.

In one example of the invention, a 4,000 pound duty load car with a total hanging weight of about 8,000 pounds, to experience a safety stop at 1 g would require a stopping force of 2 g (car deceleration plus gravity). The total stopping force necessary is 16,000 pounds. Assuming, for purposes of this example, a coefficient of friction in the friction surface 24 of 1.0, 16,000 pounds of force against the rail 14 would be sufficient. A pressure of 50 psi or less is desirable to avoid damaging the concrete guide rail. A 50 psi pressure over about 320 square inches produces the desired pounds of force against the rail. In a perfect system this could be distributed over at least two opposing friction surfaces on each side of the car. A larger surface area for each is employed however to avoid a failure of the system to stop the car in the event one side does not function. Since each safety 16 comprises two wedges 20, the surface area for each in a worst case scenario of only one safety working is 160 square inches provided by each wedge. To complete this example, the contact area of the rail surface must be considered which may be preferably about 4 inches in width. (It should be noted that larger rails may be employed and that the dimensions provided are only by way of example and are not intended to be limiting.) Thus a safety of 40 inches long and 4 inches wide will effect the desired stopping power.

Forty inches in length for a safety would provide an effective yet somewhat unwieldy product. Therefore it is desirable to provide multiple safeties on each side of the elevator car 10 each having a smaller more easily handled and manufactured friction surface 24.

Referring to FIGS. 3A and 3B a multi safety array is schematically illustrated in the disengaged position (FIG. 3A) and the engaged position (FIG. 3B). This is one possible arrangement to reduce the needed surface area of each individual wedge. By reducing the surface area required and since surface area is gained or lost primarily in the y-axis, the needed height of the wedge is reduced. This is of significant benefit because with a shorter height of the wedge the angle at the non-rail-contacting side of the wedge is consequently more aggressive. The wedge then is moved more laterally over a shorter distance of vertical movement. The shorter the vertical movement necessary to engage the wedge the shorter the time needed to stop the elevator car. In this embodiment of the invention, each of the wedges 20 are actuated by the same governor rope 18 simply having a plurality of attachments 26. This embodiment operates identically to the formerly described embodiment but simply over multiple safeties. There may be as many safeties as desired, dictated by surface area required and the size of wedges employed. Safeties may be mounted above or below the elevator car frame if frame space mounting locations became a limiting factor.

Figure 4A:
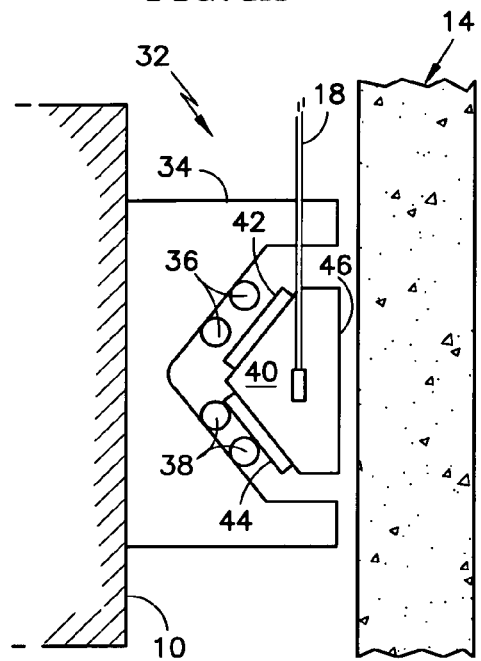
FIG. 4A is a schematic view of a bidirectional safety device of the invention.
Figure 4C:
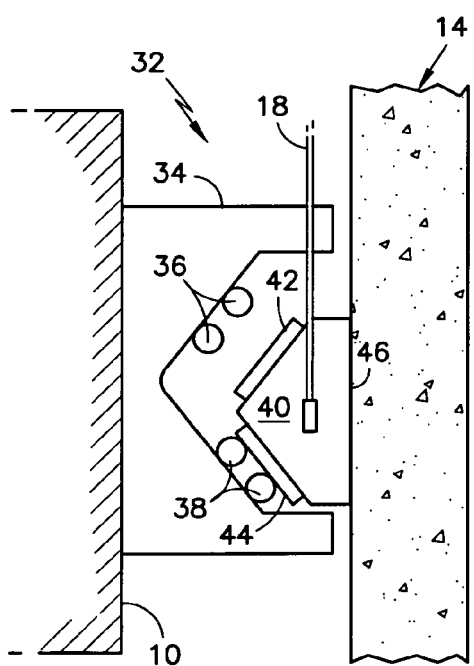
FIG. 4C is a schematic view of the bidirectional safety device of FIG. 4A in an engaged position for a second direction.
Figure 4B:
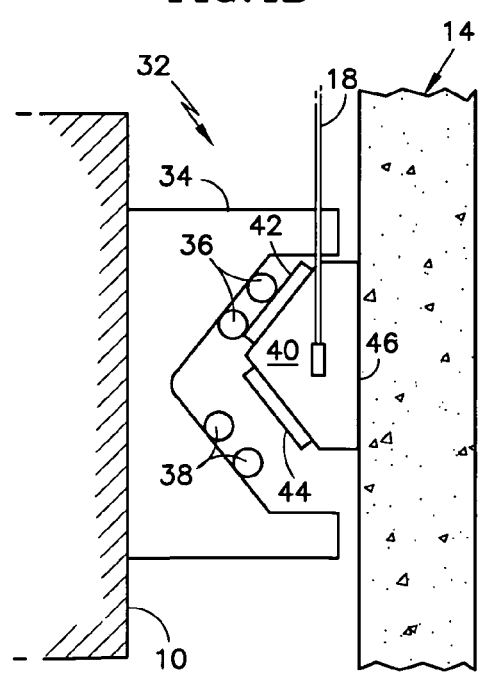
FIG. 4B is a schematic view of the bidirectional safety device of FIG. 4A in an engaged position for a first direction.

In yet another embodiment of this invention, referring to FIGS. 4A–4C, a bidirectional safety 32 as illustrated. The bidirectional safety of the invention comprises housing 34 which supports two sets of rollers 36 and 38 oriented in a symmetrical pattern relative to rail 14. The angles simply must provide a normal force on the rail to be effective as described above. Roller 36 urges bidirectional wedge 40 toward rail 14 to arrest a downward movement of car 10 (see FIG. 4B) while upward movement of car 10 is arrested by a wedge 40 moving in the opposite direction (see FIG. 4C). In this embodiment two bearing surfaces are employed which are identified as 42 and 44 and interact with rollers 36 and 38 respectively depending upon whether the elevator case is in an overspeed condition downwardly or upwardly. The downward overspeed condition braking is illustrated in FIG. 4B wherein bearing surface 42 is in contact with rollers 36. Conversely, the upward overspeed condition braking is illustrated in FIG. 4C wherein bearing surface 44 is in contact with rollers 38. The friction surface 46 is the same in each case and is defined as in the foregoing embodiments. In other respects the invention functions as do the foregoing embodiments.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A guide rail safety device, for an elevator car riding on a non-metallic guide rail formed of concrete, the guide rail safety device comprising:
   a housing;
   a wedge disposed in the housing, the wedge having a friction surface aligned for contact with the non-metallic guide rail;
   at least one horizontal locator disposed in the housing, for engaging the wedge and urging the friction surface into contact with the non-metallic guide rail so that the friction surface is wedged against the non-metallic guide rail by motion of the elevator car along the non-metallic guide rail; and
   an actuator for triggering urging of the friction surface by the horizontal locator,
   wherein the friction surface is sized and the wedge is shaped so that, when urged by the horizontal locator into contact with the non-metallic guide rail, the friction surface is wedged against the non-metallic guide rail with a pressure of not more than approximately 50 psi on the non-metallic guide rail, arresting the motion of the elevator car.

2. The guide rail safety device as claimed in claim 1, wherein the wedge further comprises a bearing surface that is harder than and inclined relative to the friction surface for engagement by the horizontal locator.

3. The guide rail safety device as claimed in claim 2, wherein the bearing surface is comprised of a material that is selected from steel and iron.

4. The guide rail safety device as claimed in claim 2, wherein the wedge further comprises a wedge-shaped body, wherein the friction surface is integral with the wedge-shaped body, and wherein the bearing surface is affixed to the wedge-shaped body.

5. The guide rail safety device as claimed in claim 1, wherein the friction surface is formed of a material that has a coefficient of friction of approximately 1.0 relative to the non-metallic guide rail.

6. The guide rail safety device as claimed in claim 1, wherein the friction surface is comprised of rubber material.

7. The guide rail safety device as claimed in claim 6, wherein the rubber material of the friction surface comprises vulcanized rubber.

8. The guide rail safety device as claimed in claim 1, wherein a plurality of the wedges is provided on each of two opposing sides of the non-metallic guide rail.

9. The guide rail safety device as claimed in claim 1, wherein the horizontal locators urge the friction surface into contact with the non-metallic guide rail in response to longitudinal movement of the wedge relative to the housing, and wherein the actuator causes the wedge to move longitudinally relative to the housing.

10. The guide rail safety device as claimed in claim 1, wherein the guide rail safety device is bidirectional, and two of the horizontal locators are arranged so that only one of the two horizontal locators at a time urges the friction surface into contact with the non-metallic guide rail, and wherein the actuator can trigger the urging of the friction surface by either of the two horizontal locators.

11. A guide rail safety device, for an elevator car riding on a non-metallic guide rail, the guide rail safety device comprising:
  a housing;
  a wedge disposed in the housing, the wedge having a friction surface aligned for contact with the non-metallic guide rail, the friction surface being formed of a material that has a coefficient of friction of approximately 1.0 relative to the non-metallic guide rail;
  at least one horizontal locator disposed in the housing for engaging the wedge and urging the friction surface into contact with the non-metallic guide rail so that the friction surface is wedged against the non-metallic guide rail by motion of the elevator car along the non-metallic guide rail; and
  an actuator for triggering urging of the friction surface by the horizontal locator.

12. The guide rail safety device as claimed in claim 11, wherein the wedge further comprises a bearing surface that is harder than and inclined relative to the friction surface for engagement by the horizontal locator.

13. The guide rail safety device as claimed in claim 12, wherein the bearing surface is comprised of a material that is selected from steel and iron.

14. The guide rail safety device as claimed in claim 12, wherein the wedge comprises a wedge-shaped body, wherein the friction surface is integral with the wedge-shaped body, and wherein the bearing surface is affixed to the wedge-shaped body.

15. The guide rail safety device as claimed in claim 11, wherein the friction surface is sized and the wedge is shaped so that, when urged by the horizontal locator into contact with the non-metallic guide rail, the friction surface is wedged against the non-metallic guide rail with a pressure of not more than approximately 50 psi on the non-metallic guide rail, arresting the motion of the elevator car.

16. The guide rail safety device as claimed in claim 11, wherein the friction surface is comprised of rubber material.

17. The guide rail safety device as claimed in claim 16, wherein the rubber material of the friction surface comprises vulcanized rubber.

18. The guide rail safety device as claimed in claim 11, wherein a plurality of the wedges is provided on each of two opposing sides of the non-metallic guide rail.

19. The guide rail safety device as claimed in claim 11, wherein the horizontal locators urge the friction surface into contact with the non-metallic guide rail in response to longitudinal movement of the wedge relative to the housing, and wherein the actuator causes the wedge to move longitudinally relative to the housing.

20. The guide rail safety device as claimed in claim 11, wherein the guide rail safety device is bidirectional, and two of the horizontal locators are arranged so that only one of the two horizontal locators at a time urges the friction surface into contact with the non-metallic guide rail, and wherein the actuator can trigger the urging of the friction surface by either of the two horizontal locators.

* * * * *